US012117155B2

(12) United States Patent
Holliday Orellana

(10) Patent No.: US 12,117,155 B2
(45) Date of Patent: Oct. 15, 2024

(54) CUSTOMIZABLE DECORATION AND LIGHTING SYSTEM

(71) Applicant: Monica Holliday Orellana, Baltimore, MD (US)

(72) Inventor: Monica Holliday Orellana, Baltimore, MD (US)

( * ) Notice: Subject to any disclaimer, the term of this patent is extended or adjusted under 35 U.S.C. 154(b) by 0 days.

(21) Appl. No.: 18/449,023

(22) Filed: Aug. 14, 2023

(65) Prior Publication Data

US 2024/0247797 A1 Jul. 25, 2024

Related U.S. Application Data

(60) Provisional application No. 63/440,128, filed on Jan. 20, 2023.

(51) Int. Cl.

*F21V 33/00* (2006.01)
*B44C 3/12* (2006.01)
*F21V 21/14* (2006.01)

(52) U.S. Cl.

CPC ............ *F21V 33/0028* (2013.01); *B44C 3/12* (2013.01); *F21V 21/14* (2013.01)

(58) Field of Classification Search

CPC ......... F21V 33/0028; F21V 21/14; B44C 3/12
See application file for complete search history.

(56) References Cited

U.S. PATENT DOCUMENTS

| | | | | |
|---|---|---|---|---|
| 4,774,646 A | | 9/1988 | L'Heureux | |
| 5,639,521 A | * | 6/1997 | Fraus | A47G 33/06 428/10 |
| 5,911,501 A | | 6/1999 | Katz | |
| 6,116,752 A | * | 9/2000 | Mayfield | F21V 21/08 362/147 |
| 6,155,526 A | | 12/2000 | Brown | |
| 7,815,435 B2 | | 10/2010 | Riley | |
| 2007/0111178 A1 | | 5/2007 | Riley | |
| 2014/0022767 A1 | * | 1/2014 | Martinez | F21V 33/006 362/145 |

* cited by examiner

*Primary Examiner* — Leah Simone Macchiarolo
(74) *Attorney, Agent, or Firm* — Brennan, Manna & Diamond, LLC

(57) ABSTRACT

A versatile and convenient holiday season or occasion decoration system that includes a sleeve-like body made of a flexible and stretchy material, with a plurality of strips integrated to it. The strips have pre-manufactured holes, enabling users to attach the system securely to a variety of structures using fasteners such as clips or strings. The decoration system also includes a decoration kit having a plurality of decorative items configured to detachably attach to the sleeve-like body on the integrated hooks, wherein the decorative items represent different cultural and religious holidays, enabling users to customize the system according to their personal preferences and cultural traditions. In one embodiment, the sleeve-like body has a continuous LED light strip attached on its exterior surface that includes a plurality of LED lights designed to illuminate in different colors, and a color changing button positioned on one end of the sleeve-like body.

20 Claims, 5 Drawing Sheets

CUSTOMIZABLE DECORATION AND LIGHTING SYSTEM

CROSS-REFERENCE TO RELATED APPLICATION

The present application claims priority to, and the benefit of, U.S. Provisional Application No. 63/440,128, which was filed on Jan. 20, 2023 and is incorporated herein by reference in its entirety.

FIELD OF THE INVENTION

The present invention generally to the field of decoration systems. More specifically, the present invention relates to a novel decoration and lighting system that can be customized to represent the spirit of different holiday seasons without removing the complete decoration system. The system includes a plurality of decorative items representing different cultural and religious holidays such as Christmas, Halloween, Easter, and the like, that are detachably attached to a sleeve-like body. Accordingly, the present disclosure makes specific reference thereto. Nonetheless, it is to be appreciated that aspects of the present invention are also equally applicable to other like applications, devices, and methods of manufacture.

BACKGROUND

By way of background, holiday and festival decorations are an important part of celebrating special occasions and enjoying the festive spirit. Decorations help create a sense of joy and excitement. Decorating homes, offices, and other spaces for holidays such as Christmas, Halloween, and birthdays is a tradition that has been passed down through generations. Individuals use a variety of decorative items for decorating their homes, offices, and more including lights, ornaments, wreaths, signs and more. Holiday decorations make the surroundings look beautiful and festive, while they also serve as a reminder of the special occasion being celebrated. In addition, decorations can also help to break the ice among individuals and are a way to connect with others who share a love for the holiday.

However, the process of applying decorations to custom-shaped areas around homes and offices, including banisters, balconies, columns, and trees, can be challenging and time-consuming. Installing decorations generally involves determining what decorations to apply based on the festival, occasion, and/or holiday, purchasing and/or retrieving the decorations, wrapping lights around the structure, and hanging the decorations. Purchasing decorations can also be costly, which adds to the challenge of decorating.

Moreover, keeping the installed decorations secure is also difficult, as tape, staples, and other adhesives used for installing the decorations can be unreliable while potentially damaging the surface they are attached to. The reliability of tape, for example, degrades with weather and long-term storage. Tape can also scrape painted surfaces. Staples can affect the original appearance of the structure and may limit the options for the next décor design. Securing structures will also affect the finished surface of the installed area. Individuals need a comprehensive light and decoration system that solves the problems associated with conventional decorations used by individuals during festivals and holidays.

It is common for individuals to change their decorations to match the theme or mood of the festival or occasion. However, this often requires taking down the existing decorations and replacing them with new ones, which can be time-consuming and tedious. Further, most decorations are not modular, meaning that they are typically designed for a specific holiday or occasion and cannot be easily repurposed or adapted for another event. Individuals desire a decoration system that can easily be adapted for different occasions without completely removing the decoration system.

Therefore, there exists a long felt need in the art for an improved light and decoration system for Christmas, Halloween, birthdays, anniversaries, and more. There is also a long felt need in the art for a holiday decoration system that can be easily installed and secured around a column, railing, mantel, banister, or other similar area. Additionally, there is a long felt need in the art for a decoration system that can be easily modified and adapted for different occasions. Moreover, there is a long felt need in the art for a holiday decoration system that can be used for multiple festivals and holidays. Further, there is a long felt need in the art for a holiday decoration system that is easily secured after installation and does not deteriorate the surfaces. Furthermore, there is a long felt need in the art for a light and decoration system that enables users to interchange decorations and lights to accommodate different holidays. Finally, there is a long felt need in the art for a holiday decoration system that allows individuals to save considerable time and effort when installing decorations for different holidays and events.

The subject matter disclosed and claimed herein, in one embodiment thereof, comprises a customized holiday seasons decoration system. The system includes a planar and flexible sleeve-like body configured to expand and contract to fit various sizes and shapes of columns or banisters, a plurality of strips of different dimensions integrated to the sleeve-like body, each strip having at least one pre-manufactured hole adapted to allow for the attachment of the decoration system to a column, railing, mantel, banister, tree, and the like using a fastener, a decorations kit including different decorative items representing spirit of different festivals, holidays, and seasons, each decorative item is configured to be detachably attached to the sleeve-like body, the sleeve-like body having a plurality of hooks for detachably receiving the decorative items, a plurality of lights designed to be detachably attached to the hooks for providing adequate lighting along with the decorations, wherein the sleeve-like body and strips remain attached around a structure while the individual decoration items and lights can be attached or taken down as per the preference of the user. In this manner, the holiday decoration system of the present invention accomplishes all of the forgoing objectives and provides users with a comprehensive light and decoration system for a Halloween, a Thanksgiving, a Christmas, a Valentines Day, a St. Patrick's Day, an Easter, a Fourth of July a New Year's Day, a wedding, an anniversary, a birthday, a funeral, a memorial, and a Veteran's Day, and more. The system allows users to install decorations around a column, railing, mantel, banister, or other similar area via a sleeve and fasteners such as strings or clips. The system enables users to interchange decorations and lights on the sleeve to accommodate different holidays or occasions, and to save time and effort in installing decorations.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a holiday seasons light and decoration system. The system is adaptable for different holiday seasons and further comprises a planar sleeve-like body made of a flexible and stretchy material that can expand and contract to fit various sizes and shapes of columns or banisters, a plurality of strips of different dimensions integrated to the sleeve-like body, each strip having at least one pre-manufactured hole adapted to allow for the attachment of the decoration system to a column, railing, mantel, banister, tree, and the like, a decorations kit including different decorative items representing different festivals, holidays, and seasons, each decorative item is configured to be detachably attached to the sleeve-like body, the sleeve-like body having a plurality of hooks for detachably receiving the decorative items, a plurality of lights designed to be detachably attached to the hooks for providing adequate lighting along with the decorations, wherein the sleeve-like body and strips remain attached around a structure while the individual decoration items and lights can be attached or taken down as per the preference of the user.

In a further embodiment of the present invention, a decoration system for different holiday seasons. The decoration system includes a sleeve-like body having a continuous LED light strip attached to the exterior surface of the sleeve, the strip including a plurality of LED lights designed to illuminate in one or more colors, a color changing push button positioned on one end of the sleeve-like body configured for changing the color of the LEDs for customizing the decoration system, a power cord for connecting to an electric supply for providing electric power to the LEDs, a plurality of strips for securing the system to a structure such as a banister or railing, each strip including at least one pre-manufactured hole used for securing the system to the structure, a plurality of decorative items configured to detachably attach to the sleeve-like body and plurality of strips, including a plurality of items used for expressing the spirit of different festivals, occasions, and/or holiday seasons. Alternatively, the electric supply can originate from a connection to a solar panel.

In a further embodiment of the present invention, the flexible and stretchy material of the sleeve-like body is made of a combination of polyester and nylon for enhanced durability and resistance to wear and tear.

In a further embodiment of the present invention, the LED light strip comprises of 100 or more LED lights, each LED light having a wattage of 0.25 W or more for providing bright and vibrant illumination.

In a further embodiment of the present invention, the decorative items include a plurality of symbols and designs representing different cultural and religious holidays such as Christmas, Halloween, Easter, and the like, thereby enabling users to customize the system according to their personal preferences, holidays, cultural traditions, and celebrations (i.e., Pride celebrations, weddings, memorials, et. al.). In addition, the associated lighting can be changed and selected to correspond to the chosen holiday, celebration, et. al.

Numerous benefits and advantages of this invention will become apparent to those skilled in the art to which it pertains upon reading and understanding of the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
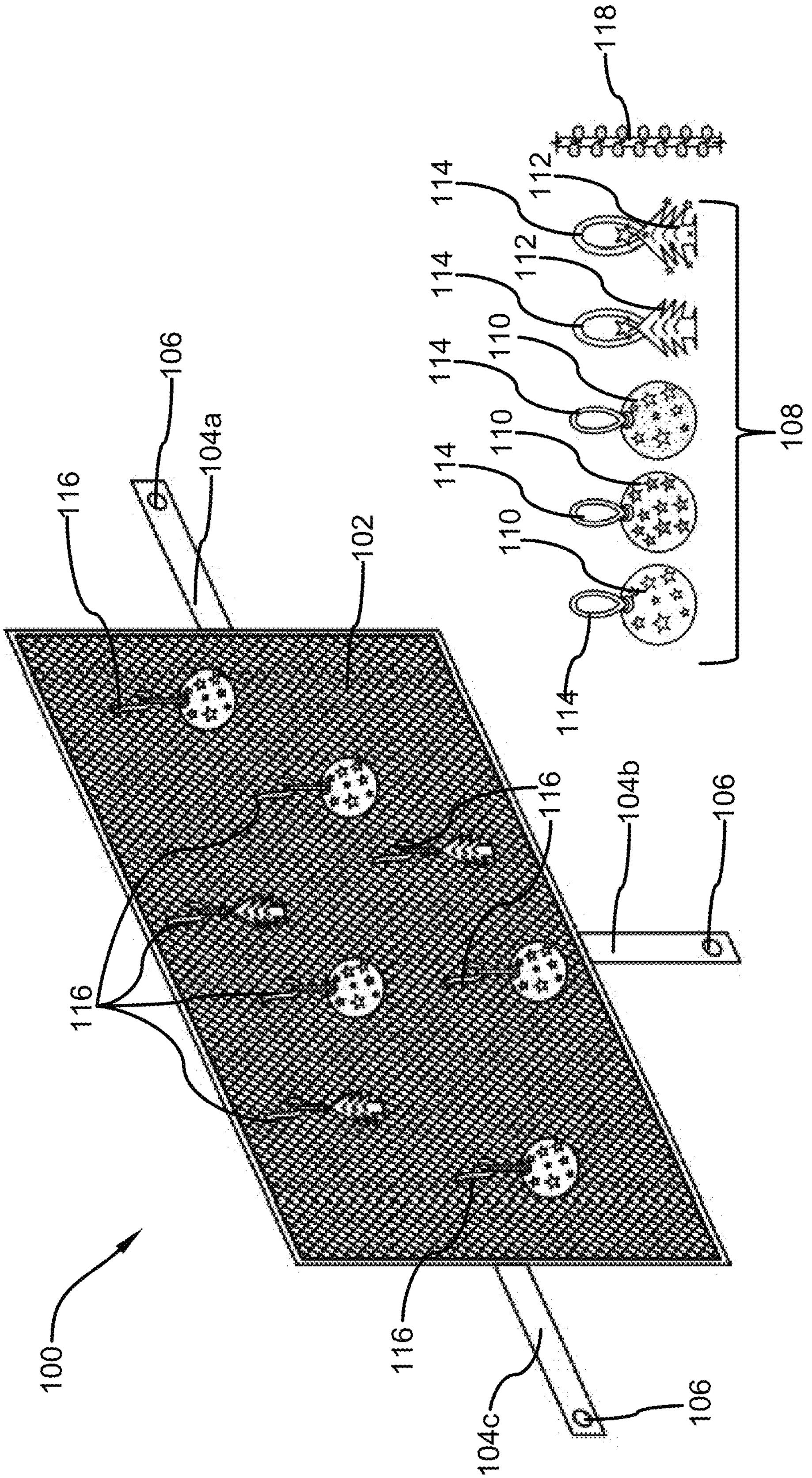
FIG. 1 illustrates a perspective view of one potential embodiment of holiday seasons light and decoration system of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long felt need in the art for an improved light and decoration system for Christmas, Halloween, birthdays, anniversaries, and more. There is also a long felt need in the art for a holiday decoration system that can be easily installed and secured around a column, railing, mantel, banister, or other similar area. Additionally, there is a long felt need in the art for a decoration system that can be easily modified and adapted for different occasions. Moreover, there is a long felt need in the art for a holiday decoration system that can be used for multiple festivals and holidays. Further, there is a long felt need in the art for a holiday decoration system that is easily secured after installation and does not deteriorate the surfaces. Furthermore, there is a long felt need in the art for a light and decoration system that enables users to interchange decorations and lights to accommodate different holidays. Finally, there is a long felt need in the art for a holiday decoration system that allows individuals to save considerable time and effort when installing decorations for different holidays and events.

The present invention, in one exemplary embodiment, is a decoration system for different holiday seasons. The decoration system features a sleeve-like body having a continuous LED light strip, the strip including a plurality of LED lights designed to illuminate in one or more colors, a color changing push button positioned on one end of the sleeve-like body configured for changing the color of the LEDs for customizing the decoration system, a plurality of strips, each strip including at least one pre-manufactured hole for securing the system to a structure such as a banister using a fastener such as a clip or a string, a plurality of decorative items configured to detachably attach to the sleeve-like body and plurality of strips, including a plurality of items used for expressing the spirit of different festivals and holiday seasons.

Figure 3:
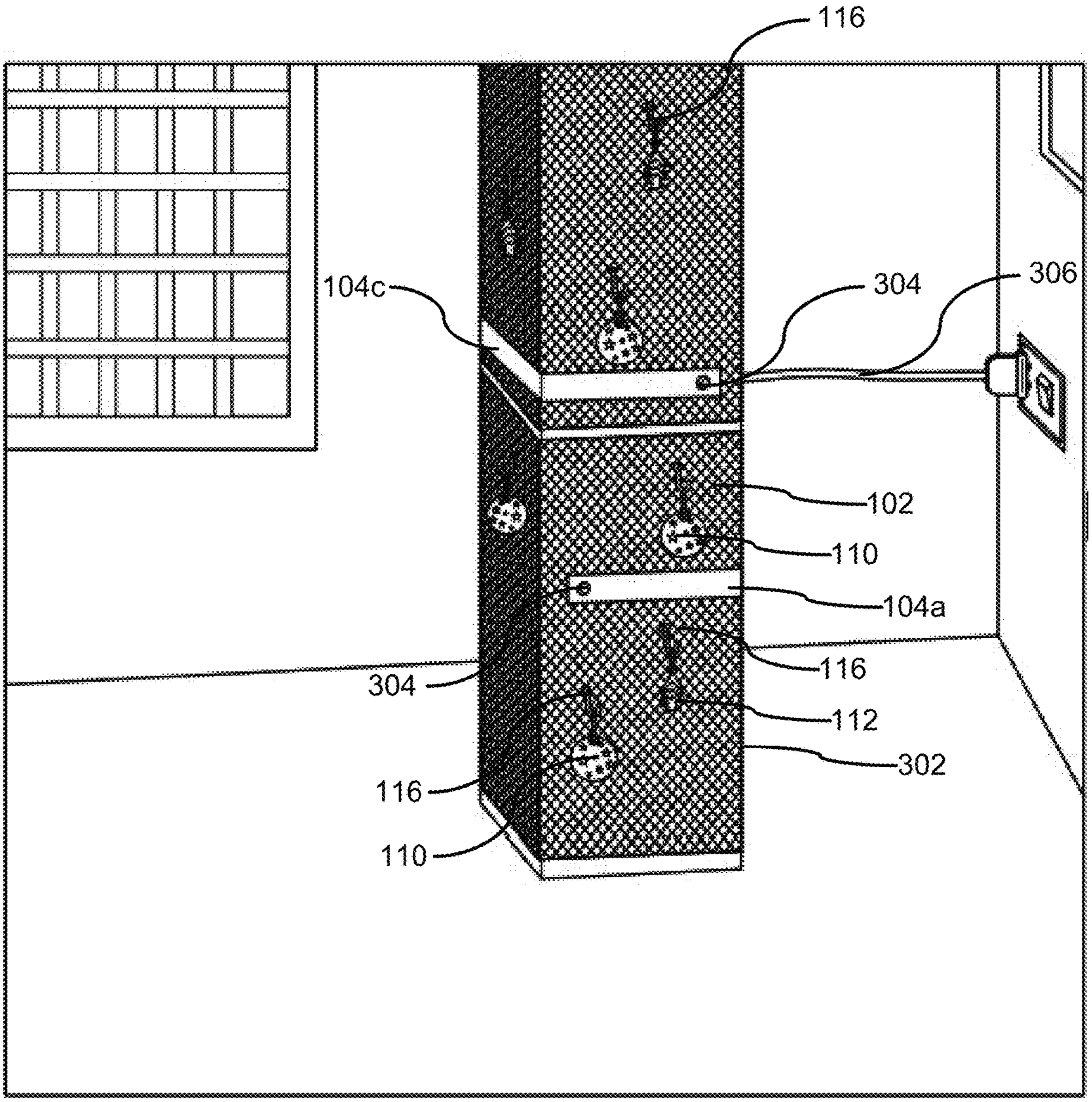
FIG. 3 illustrates a perspective view showing the decoration and light system of FIG. 1 installed around a column of a home in accordance with the disclosed architecture.
Figure 4:
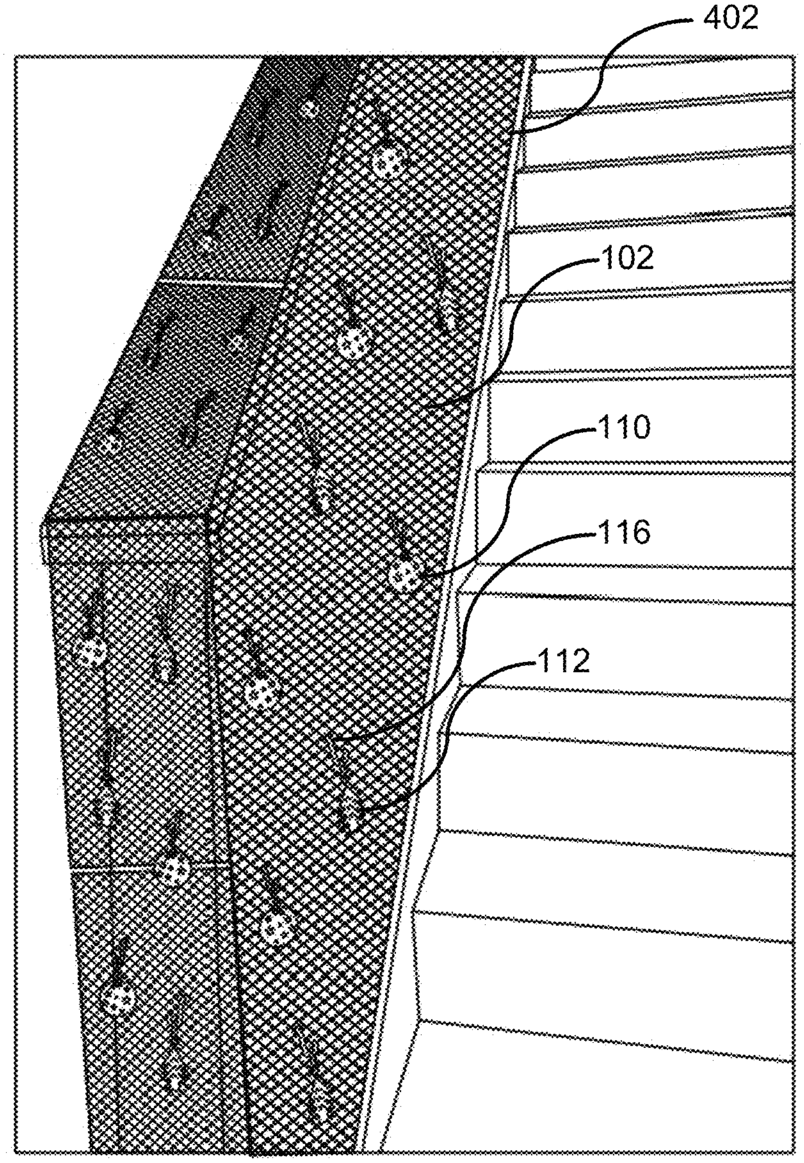
FIG. 4 illustrates perspective view showing the decoration system of FIG. 1 installed on a banister for decoration in accordance with the disclosed architecture.

Referring initially to the drawings, FIG. 1 illustrates a perspective view of one potential embodiment of a holiday seasons light and decoration system of the present invention in accordance with the disclosed architecture. The holiday seasons light and decoration system 100 of the present embodiment includes a sleeve-like body 102 configured to be attached around a portion of a home or a building such as a column or banister as illustrated in FIGS. 3 and 4. The sleeve-like body 102 is typically made of a flexible and stretchy material that can expand and contract to fit various sizes and shapes of columns or banisters. The use of a sleeve-like body 102 allows for easy installation and removal of the decoration, as well as, providing a secure and stable base for the decorations. The sleeve-like body 102 can be of different lengths to meet requirements of different users and can be made from one or more of polyester, nylon, netting, and vinyl. The sleeve-like body 102 is durable, easy to clean, and able to withstand the elements in order to ensure that the decoration system can be used for many seasons and holidays.

A plurality of strips 104*a-n* of different dimensions are integrated to the sleeve-like body 102. Each strip of the plurality of strips 104*a-n* has a plurality of pre-manufactured holes 106, the holes 106 are adapted to allow for the attachment of the decoration system 100 to a column, railing, mantel, banister, tree, and the like. Individual strips can be of the same or different material and can be made from one or more of polyester, nylon, fabric, PVC, netting, and vinyl. The pre-manufactured holes 106 are used with one or more fasteners such as a string for tying the decoration system 100 securely and easily. The plurality of strips 104*a-n* are oriented in different directions and are preferably integrated to the sleeve-like body 102 or can alternatively be detachably attached to the sleeve-like body 102.

The decoration system 100 includes a decorations kit 108 having different decorative items 110, 112 for different festivals, holidays, and seasons. The decorations kit 108 is configured to be detachably attached to the sleeve-like body 102, thereby enabling a user to use the decoration system 100 for different seasons and holidays. Each item of the decoration kit 108 includes a fastener 114 that is detachably attached one hook of the plurality of integrated hooks 116 positioned on the sleeve-like body 102. The sleeve-like body 102 has the plurality of integrated hooks 116 positioned along the length thereof, wherein individual integrated hooks receive a decorative item from the decorations kit 108. Alternatively, the integrated hooks can each receive a portion of a relatively large and continuous decorative item, such as a wreath, garland, festoon, et. al. This enables a user to customize the decoration system 100 as per the occasion and preferences.

The decorations kit 108 also includes a plurality of lights 118 that are designed to be detachably attached to the integrated hooks 116, thereby providing adequate lighting along with the decorations. The plurality of lights 118 are preferably self-powered (i.e., solar powered) and can include integrated cells or batteries for providing electric power. While using the decoration system 100, the sleeve-like body 102 and the strips 104*a-n* can remain attached around a structure while the individual decoration items of the sets 110, 112 and the lights 118 can be attached or taken down as per the preference. Alternatively, the sleeve-like body 102, strips 104*a-n*, decorative items, and lights can be removed as a unit, folded, and then stored. This considerably reduces the time spent on installing and changing decorations for different holidays and festivals.

Figure 2:
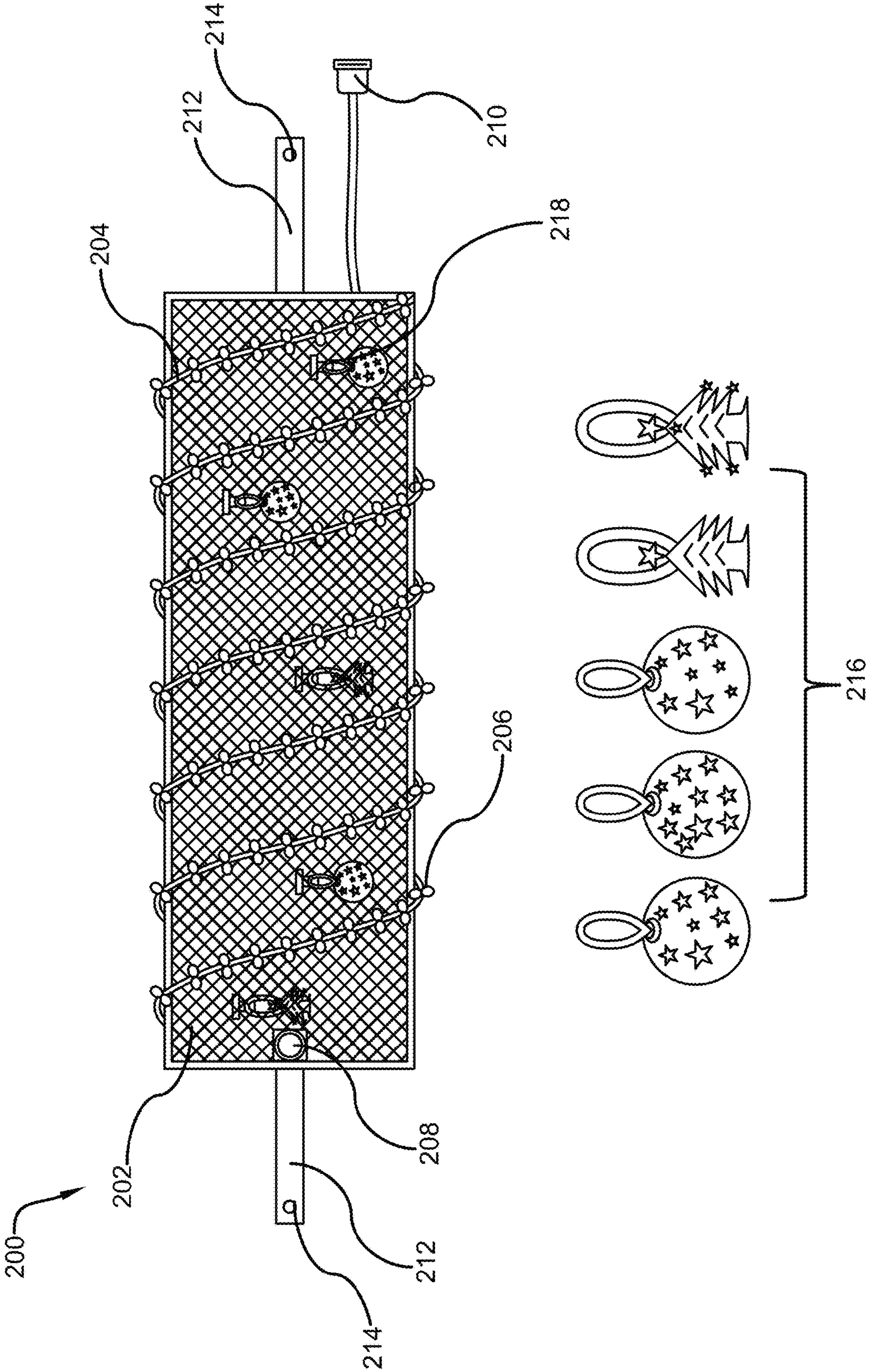
FIG. 2 illustrates a perspective view of another embodiment of the holiday decoration system of the present invention in accordance with the disclosed architecture.

FIG. 2 illustrates a perspective view of another embodiment of the holiday decoration system of the present invention in accordance with the disclosed architecture. In the present embodiment, the sleeve-like body 202 of the decoration system 200 has a continuous LED light strip 204 attached on the exterior surface of the sleeve 202. The LED light strip 204 includes a plurality of LED lights 206 wherein each LED light is designed to illuminate in one or more colors. A color changing button 208 is positioned on one end of the sleeve-like body 202 for changing the color of the LEDs 206 for customizing the decoration system 200.

A power cord 210 can also be present for connecting to an electric supply or solar panel for providing electric power to LEDs 206. The sleeve-like body 202 has a plurality of strips 212 for securing the system 200 to a structure such as a banister or railing. Individual strips include at least one pre-manufactured hole 214 used for securing the system 200 to the structure. A plurality of decorative items 216 configured to detachably attach to the sleeve-like body 202 and plurality of strips 212 are included in the system 200 wherein the decorative items 216 include a plurality of items used for expressing spirit of different festivals and holiday seasons. The decorative items 216 are configured to detachably attach to the integrated hooks 218 disposed on the sleeve-like body 202.

FIG. 3 illustrates a perspective view showing the decoration and light system of FIG. 1 installed around a column of a home in accordance with the disclosed architecture. As illustrated, the sleeve-like body 102 is wrapped around a column 302 and is secured using the fasteners 304 such as clips fastened through the holes 106 for a secure installation. The decorative items 110, 112 are detachably fastened to the hooks 116 of the sleeve-like body 102.

The decorative items 110, 112 are detachably attached to the hooks 116, thereby enabling a user to remove and replace the decorative items easily while the sleeve-like body 102 remains installed on the column 302. For providing additional illumination, the lights 118 can also be attached and an addition power supply using an independent power cord 306 can also be used for providing illumination and decoration.

FIG. 4 illustrates perspective view showing the decoration system of FIG. 1 installed on a banister for decoration in accordance with the disclosed architecture. The sleeve-like body 102 is installed on the banister 402 to cover the banister 402 and is secured using fasteners including but not limited to strings, mechanical fasteners, and the like. A plurality of decorative items 110, 112 are detachably attached to the hooks 116 positioned on the sleeve-like body 102. The self-charged lights 118 or externally powered lights can also be attached to the hooks 116 and/or sleeve-like body 102 for enhancing decoration and illumination.

Figure 5:
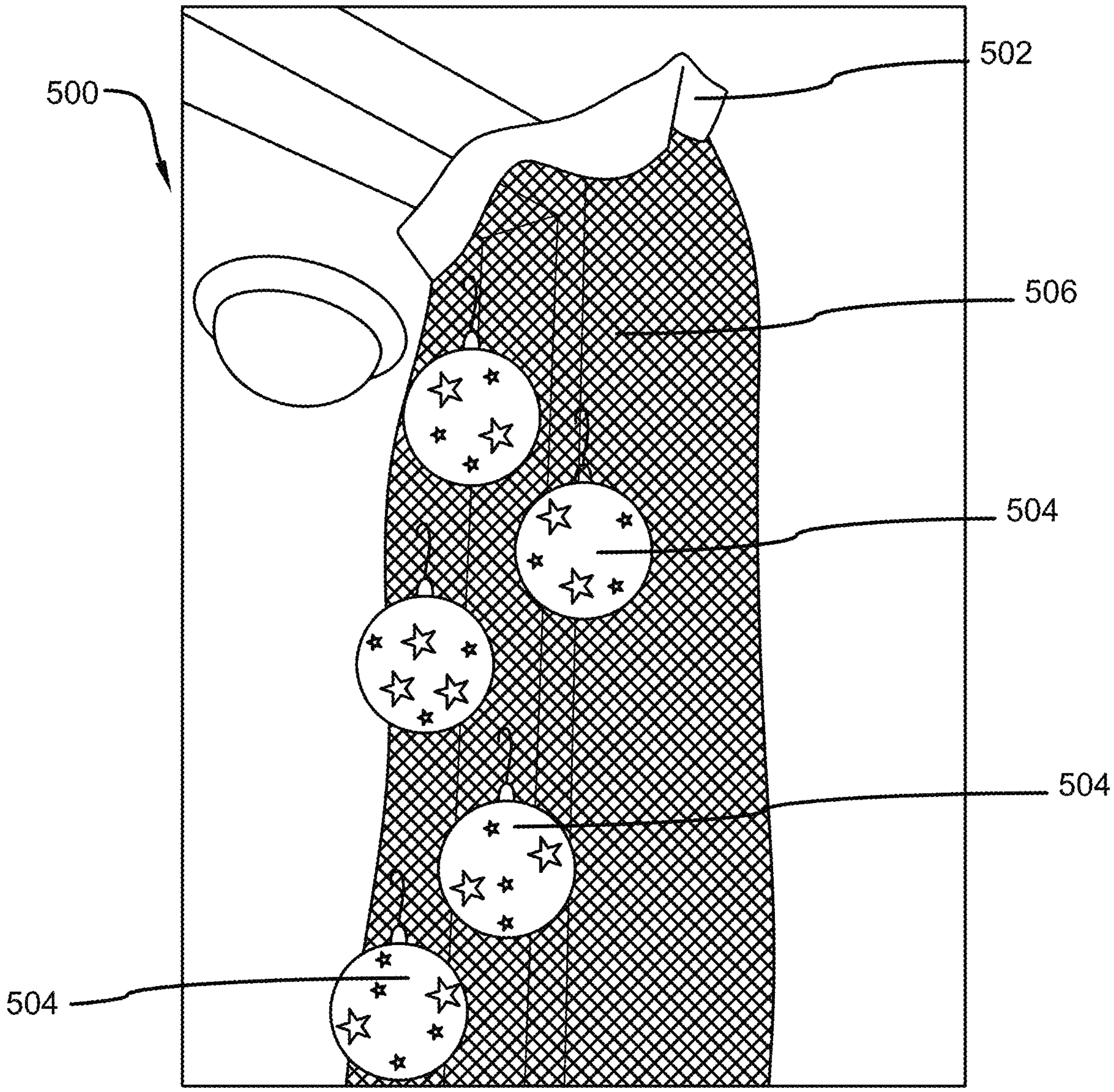
FIG. 5 illustrates a perspective view showing another embodiment of the holiday decoration system of the present invention installed in a home in accordance with the disclosed architecture.

FIG. 5 illustrates a perspective view showing another embodiment of the holiday decoration system of the present invention installed in a home in accordance with the disclosed architecture. In the present embodiment, the decoration system 500 has a rectilinear sleeve-like body 502 having a plurality of detachably attached decorative items 504 attached to the sleeve-like body through a corresponding string 506. The body 502 can be secured to a wall or a column using an adhesive or any fastener (not shown) for secure installation.

The decoration system of different embodiments of the present invention are reusable, machine-washable, customizable and can be adapted for different festivals and holiday seasons. The decoration systems are foldable and can be rolled for easy storage and transport.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "holiday seasons light and decoration system", "light and decoration system", "decoration system", "holiday decoration system", and "system" are interchangeable and refer to the holiday seasons light and decoration system 100, 200, 500 of the present invention.

Notwithstanding the forgoing, the holiday seasons light and decoration system 100, 200, 500 of the present invention can be of any suitable size and configuration as is known in the art without affecting the overall concept of the invention, provided that it accomplishes the above stated objectives. One of ordinary skill in the art will appreciate that the holiday seasons light and decoration system 100, 200, 500 as shown in the FIGS. are for illustrative purposes only, and that many other sizes and shapes of the holiday seasons light and decoration system 100, 200, 500 are well within the scope of the present disclosure. Although the dimensions of the holiday seasons light and decoration system 100, 200, 500 are important design parameters for user convenience, the holiday seasons light and decoration system 100, 200, 500 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An occasion light and decoration system comprising:
a decoration kit having a flexible mounting body, integrated lighting, and a plurality of decorations for celebrating a plurality of occasions;
wherein said flexible mounting body having a decoration mounting surface for selectively installing and removing of said of plurality of decorations thereto;
wherein said flexible mounting body having a plurality of mounting strips for selectively installing said flexible mounting body to an area;
wherein said plurality of decorations having a plurality of groups of decorations;
wherein each group of said plurality of groups of decorations related to one of said plurality of occasions;
wherein said integrated lighting having a plurality of bulbs and colors for said plurality of occasions; and
further wherein a selectable group of said plurality of bulbs related to said one of said plurality of occasions.

2. The decoration system of claim 1, wherein said flexible mounting body is in the form of a sleeve for attaching around a curved said area.

3. The decoration system of claim 2, wherein said curved area is selected from a group consisting of a column, a railing, a mantel, a banister, and a tree.

4. The decoration system of claim 1, wherein said flexible mounting body is stretchable for expansion and contraction.

5. The decoration system of claim 4, wherein said flexible mounting body is selected from a material consisting of a polyester, a nylon, a netting, and a vinyl.

6. The decoration system of claim 5, wherein said plurality of mounting strips are selected from a material consisting of a polyester, a nylon, a fabric, a PVC, a netting, and a vinyl.

7. The decoration system of claim 5, wherein said plurality of occasions is selected from a group of occasions consisting of a Halloween, a Thanksgiving, a Christmas, a Valentines Day, a St. Patrick's Day, an Easter, a Fourth of July a New Year's Day, a wedding, a birthday, a funeral, a memorial, and a Veteran's Day.

8. An occasion light and decoration system comprising:
a decoration kit having a flexible mounting body, integrated lighting, and a plurality of decorations for celebrating a plurality of occasions;
wherein said flexible mounting body having a decoration mounting surface for selectively installing and removing of said of plurality of decorations thereto;
wherein said flexible mounting body having a plurality of mounting strips for selectively installing said flexible mounting body to an area;
wherein said flexible mounting body is stretchable for expansion and contraction;
wherein said plurality of decorations having a plurality of groups of decorations;
wherein each group of said plurality of groups of decorations related to one of said plurality of occasions;
wherein said integrated lighting having a plurality of bulbs and colors for said plurality of occasions;
wherein a selectable group of said plurality of bulbs related to said one of said plurality of occasions; and
further wherein said plurality of occasions is selected from a group of occasions consisting of a Halloween, a Thanksgiving, a Christmas, a Valentines Day, a St. Patrick's Day, an Easter, a Fourth of July a New Year's Day, a wedding, a birthday, a funeral, a memorial, and a Veteran's Day.

9. The decoration system of claim 8, wherein said flexible mounting body is in the form of a sleeve for attaching around said area.

10. The decoration system of claim 9, wherein said area is selected from a group consisting of a column, a railing, a mantel, a banister, and a tree.

11. The decoration system of claim 8, wherein said flexible mounting body is selected from a material consisting of a polyester, a nylon, a netting, and a vinyl.

12. The decoration system of claim 11, wherein said plurality of mounting strips are selected from a material consisting of a polyester, a nylon, a fabric, a PVC, a netting, and a vinyl.

13. A method of decorating for a plurality of occasions, the decorative method comprising the steps of:

providing a decoration kit having a flexible mounting body, integrated lighting, and a plurality of decorations for celebrating a plurality of occasions, wherein said plurality of decorations having a plurality of groups of decorations, further wherein said integrated lighting having a plurality of bulbs and colors including a control for changing the color of said plurality of bulbs;

selectively installing and removing said plurality of decorations to a mounting surface of said flexible mounting body;

selectively installing said flexible mounting body to an area using a plurality of mounting strips connected to said flexible mounting body, wherein said flexible mounting body is stretchable for expansion and contraction;

relating and installing each group of said plurality of groups of decorations to one of said plurality of occasions; and relating and changing the color of a group of said plurality of bulbs to said one of said plurality of occasions, wherein said plurality of occasions is selected from a group of occasions consisting of a Halloween, a Thanksgiving, a Christmas, a Valentines Day, a St. Patrick's Day, an Easter, a Fourth of July a New Year's Day, a wedding, a birthday, a funeral, a memorial, and a Veteran's Day.

14. The decorative method of claim 13, wherein said flexible mounting body is in the form of a sleeve for attaching around said area.

15. The decorative method of claim 14, wherein said flexible mounting body is selected from a material consisting of a polyester, a nylon, a netting, and a vinyl.

16. The decorative method of claim 15, wherein said plurality of mounting strips are selected from a material consisting of a polyester, a nylon, a fabric, a PVC, a netting, and a vinyl.

17. The decorative method of claim 16, wherein said area is selected from a group consisting of a column, a railing, a mantel, a banister, and a tree.

18. The decorative method of claim 17, wherein said mounting surface having a plurality of spaced apart integrated hooks.

19. The decorative method of claim 18, wherein each group of said plurality of groups of decorations having a plurality of fasteners for selectively attaching to a plurality of said integrated hooks.

20. The decorative method of claim 19, wherein said flexible mounting body is a rectilinear sleeve having said plurality of said integrated hooks connected to each side of said rectilinear sleeve.

* * * * *